(12) United States Patent
Gervais et al.

(10) Patent No.: US 11,513,041 B2
(45) Date of Patent: Nov. 29, 2022

(54) MEDIUM-EMBEDDED SAMPLES

(71) Applicants: Thomas Gervais, Montreal (CA); Anne-Marie Mes-Masson, Dollard-des-Ormeaux (CA); Kayla Simeone, Montreal (CA); Robin Guay-Lord, Montreal (CA); Benjamin Peant, Saint-Hubert (CA)

(72) Inventors: Thomas Gervais, Montreal (CA); Anne-Marie Mes-Masson, Dollard-des-Ormeaux (CA); Kayla Simeone, Montreal (CA); Robin Guay-Lord, Montreal (CA); Benjamin Peant, Saint-Hubert (CA)

(73) Assignees: POLYVALOR, LIMITED PARTNERSHIP, Montreal (CA); VAL-CHUM, LIMITED PARTNERSHIP, Montreal (CA)

( * ) Notice: Subject to any disclaimer, the term of this patent is extended or adjusted under 35 U.S.C. 154(b) by 985 days.

(21) Appl. No.: 16/165,778

(22) Filed: Oct. 19, 2018

(65) Prior Publication Data

US 2020/0124507 A1 Apr. 23, 2020

(51) Int. Cl.
*G01N 1/36* (2006.01)

(52) U.S. Cl.
CPC ......... *G01N 1/36* (2013.01); *G01N 2001/368* (2013.01)

(58) Field of Classification Search
CPC .................... G01N 1/36; G01N 2001/368
See application file for complete search history.

(56) References Cited

U.S. PATENT DOCUMENTS

| | | | |
|---|---|---|---|
| 8,852,919 B2 | 10/2014 | Zhou | |
| 9,658,142 B2 | 5/2017 | Richardson et al. | |
| 2010/0291584 A1 | 11/2010 | Tseng et al. | |
| 2015/0362411 A1 | 12/2015 | Zhang et al. | |
| 2017/0369829 A1 | 12/2017 | Barbie et al. | |
| 2018/0214873 A1 | 8/2018 | Devoe et al. | |

FOREIGN PATENT DOCUMENTS

| | | |
|---|---|---|
| CN | 103920544 B | 6/2015 |
| WO | 2015069742 A1 | 5/2015 |
| WO | 2017202729 A1 | 11/2017 |
| WO | 2017223529 A1 | 12/2017 |

OTHER PUBLICATIONS

Cho, C.H. et al., "Microfluidic on-chip immunohistochemistry directly from paraffin-embedded section", Biomicrofluidics, 12(4), Jul. 19, 2018.
Jonczyk, R. et al., "Living Cell Microarrays: an Overview of Concepts", Microarrays (Basel), 5(2), Jun. 2016.
Kwon, S. et al., "A Microfluidic Immunostaining System Enales Quality Assured and Standardized Immunohistochemical Biomarker Analysis", Scientific Reports 7, Article No. 45968, Apr. 5, 2017.
Coudry, R.A. et al., "Successful Application of Microarray Technology to Microdissected Formalin-Fixed, Paraffin-Embedded Tissue", J. Mol. Diagn., 9(1), pp. 70-79, Feb. 2007.
Guay-Lord, R. et al., "Micro-dissected tissue microarrays for personalized ex vivo chemisensitivity characterization of prostate and ovarian cancer", Institut du Cancer de Montreal, 26eme Journee Annuelle Scientifique, p. 25, Dec. 2, 2016.
Astolfi, M. et al., "Micro-dissected tumor tissues on chip: an ex vivo method for drug testing and personalized therapy", Lab Chip 16, 312-325, 2016.
Wang, W.-X. et al., "Construction of Tumor Tissue Microarray on a Microfluidic Chip", Chinese J. Anal. Chem. 43, 337-642, 2015.
Parsons, M. et al., "How to make tissue microarrays", Diagnostic Histopathol. 15, 142-150, 2009.
Grabowska, A.M. et al., "Spheroid arrays for high-throughput single-cell analysis of spatial patterns and biomarker expression in 3D", Scientific Reports, 7:41160, Jan. 30, 2017.
Guay-Lord, R. et al., "Micro-dissected tissue array: a chip-based strategy for morphological and Immunohistochemical evaluation of therapeutic response", Oct. 26, 2017.
Guay-Lord, R. et al., "Micro-dissected tissue array: a chip-based strategy for morphological and Immunohistochemical evaluation of therapeutic response", Jun. 2018.
Lin, D-G. et al., "Construction of Tumor Tissue Array on an Open-Access Microfluidic Chip", Chinese J. Anal. Chem., 2018, 46(1): 113-120.

*Primary Examiner* — Lynn Y Fan
(74) *Attorney, Agent, or Firm* — BCF LLP (57) ABSTRACT

Methods and systems for preparing a medium-embedded-sample-block. The method comprises obtaining a frame having a plurality of sample wells arranged as a two-dimensional array, the frame having an open face for accessing the sample in the sample wells; placing embedding medium in the sample wells such that the embedding medium immerses the samples in the plurality of sample wells; allowing the embedding medium to form a block of embedding medium including the samples embedded therein; and separating the frame from the block of embedding medium to obtain the medium-embedded-sample-block.

20 Claims, 8 Drawing Sheets

FIG. 1

Obtaining a frame having a plurality of sample wells arranged as a two-dimensional array, the frame having an open face for accessing the samples in the sample wells. ~110

Placing embedding medium in the sample wells such that the embedding medium immerses the samples in the plurality of the sample wells ~120

Allowing the embedding medium to form a block of embedding medium including the samples embedded therein ~130

Separating the frame from the block of medium to obtain the medium-embedded-sample-block ~140

```
┌─────────────────────────────────────────────────────────────┐
│ Providing a microfluidic device, having a top portion and a │
│ bottom portion, the bottom portion comprising the frame     │──102
│ having the open face for accessing the samples in the       │
│ sample wells.                                               │
└─────────────────────────────────────────────────────────────┘
                              │
                              ▼
┌─────────────────────────────────────────────────────────────┐
│ Removing, before the placing the embedding medium in the    │
│ sample wells, the top portion of the microfluidic device    │──108
│ from the bottom portion of the microfluidic device to       │
│ expose the open face including the samples in the sample    │
│ wells.                                                      │
└─────────────────────────────────────────────────────────────┘
```

FIG. 8

```
┌─────────────────────────────────────────────────────────────┐
│ Depositing samples in at least some of the sample wells.    │──104
└─────────────────────────────────────────────────────────────┘
                              │
                              ▼
┌─────────────────────────────────────────────────────────────┐
│ Exposing at least some of the samples in the sample wells   │──106
│ to a treatment.                                             │
└─────────────────────────────────────────────────────────────┘
```

MEDIUM-EMBEDDED SAMPLES

FIELD

The present technology relates to medium embedded samples and their preparation, such as but not limited to, medium embedded biological samples.

BACKGROUND

Medium embedding of a sample, such as a biological sample of tissue, is used in analysis techniques such as histology in which thin sections of tissue are prepared onto glass slides for staining and microscopy.

In such known medium embedding methods, tissue samples from patients are embedded in an embedding medium which has a density similar to that of tissue when in a solid state to enable cutting of thin sections of the embedded tissue, typically from 3 to 15 microns, whilst preserving the structure of the tissue.

Paraffin is typically used as the embedding medium. Other embedding mediums include polymers such as methyl methacrylate, glycol methacrylate, araldite, and epon.

In order to allow the infiltration of the fixed tissue sample with the embedding medium, the tissue sample undergoes processing comprising dehydration using a dehydrant, to allow for the better infiltration of the wet fixed tissue sample with the embedding medium, and clearing, for removing the dehydrant with a clearing agent that is miscible with the embedding medium. In the case of paraffin as an embedding medium, the dehydrant is commonly a series of alcohols of varying concentration, such as 70% to 95% to 100%, and the clearing agent is xylene.

The embedding of the processed tissues involves a manual placement of the processed tissues into a histology cassette at a desired orientation relative to a top surface of the histology cassette before immersing in the embedding medium while in a liquid state and allowing the liquid embedding medium to solidify. The resultant embedded tissue comprises the tissue sample infiltrated by the embedding medium within a block of the embedding medium in the cassette. Thin sections of the embedded tissue can then be prepared for subsequent histological analysis using a microtome to cut the thin section and mounting onto a glass slide for histological analysis. This technique is typically used for diagnostic purposes of biopsy samples, for example, or for research purposes for the evaluation of biological responses and processes etc.

It is an object of the present technology to provide alternative medium embedded sample forms and their methods of manufacture.

SUMMARY

Embodiments of the present technology have been developed based on developers' appreciation of certain shortcomings associated with existing medium-embedded tissue samples.

In certain applications, it is desirable to obtain an array of medium embedded samples within the same medium block in order to enable parallel evaluations and to avoid experimental variability and technical artefacts. Throughput can also be increased leading to cost efficiencies.

Biological sample microarrays are currently made by a time consuming and laborious process in which samples must be manually positioned one-by-one into a mold before embedding in an embedding medium ready for histological analysis. Furthermore, with these existing methods, any pre-embedding treatment in which the samples are exposed to different treatments must be performed manually.

It is an object of the present technology to provide medium embedded samples and methods of making medium embedded samples which alleviate or reduce at least some of the above-noted limitations.

From a broad aspect there is provided a method of making a medium embedded sample in which the samples are arranged as an array, in which the spatial configuration is maintained during the method, and in which the manual handling of the samples is not required after a pre-treatment step of the samples.

According to certain aspects and embodiments, there is provided a method for preparing a medium-embedded-sample-block, the method comprising: obtaining a frame having a plurality of sample wells arranged as a two-dimensional array, the frame having an open face for accessing the sample in the sample wells; placing embedding medium in the sample wells such that the embedding medium immerses the samples in the plurality of sample wells; allowing the embedding medium to form a block of embedding medium including the samples embedded therein; and separating the frame from the block of embedding medium to obtain the medium-embedded-sample-block.

In certain embodiments, the placing the embedding medium in the sample wells comprises forming a layer of embedding medium above the sample wells, the layer comprising an uninterrupted layer.

In certain embodiments, placing the embedding medium in the sample wells comprises filling the sample wells with the embedding medium, filling a channel above the sample wells with the embedding medium, and forming a layer of embedding medium above the sample wells.

In certain embodiments, the method further comprises: providing a bottom portion of a microfluidic device, the bottom portion having been separated from a top portion of the microfluidic device, the bottom portion comprising the frame having the open face for accessing the samples in the sample wells.

In certain embodiments, the method further comprises, providing the microfluidic device and removing the top portion from the bottom portion to expose the open face and the samples in the sample wells.

In certain embodiments, the method further comprises, providing the microfluidic device and removing the top portion from the bottom portion to expose the open face and the samples in the sample wells.

In certain embodiments, the embedding medium is a paraffin-based composition.

In certain embodiments, before placing the embedding medium in the sample wells, the method comprises dehydrating the samples.

In certain embodiments, the embedding medium is in a liquid state when immersing the samples, and the allowing the embedding medium to form the block of embedding medium comprises allowing a change in a state of the embedding medium from the liquid state to a solid state.

In certain embodiments, the placing the embedding medium in the sample wells comprises immersing the frame in the embedding medium.

In certain embodiments, the method further comprises placing the frame within an open container, the open container being deeper than a height of the frame, and adding the embedding medium to fill the open container over the frame such that the frame is immersed in the embedding medium.

In certain embodiments, the frame is immersed in the embedding medium in an open container, the method further comprising providing a cover to the open container in contact with the embedding medium.

In certain embodiments, after the allowing the embedding medium to form the block of embedding medium including the samples embedded therein, the method further comprising removing the open container from the block of embedding medium.

In certain embodiments, the separating the frame from the block of medium to obtain the medium-embedded-sample-block, further comprises applying additional embedding medium to an exposed face of the medium block after removing the frame, and allowing the additional embedding medium to cover the exposed face of the medium block.

In certain embodiments, the method further comprises aligning the samples in the medium-embedded-sample-block on a cutting plane by reducing a viscosity of the medium-embedded-sample-block before restoring the viscosity.

In certain embodiments, the method further comprises providing the samples, which are biological biopsy samples. The biological biopsy samples may have a diameter of 500 microns. The samples may comprise individual or groups of cells.

In certain embodiments, the method further comprises exposing the samples in the sample wells to a treatment before placing the embedding medium in the sample wells.

In certain embodiments, the samples are arranged in channels in the frame, and the exposing the samples in the sample wells to the treatment comprises exposing samples in at least two different channels to different treatments.

In certain embodiments, the method further comprises cutting the medium-embedded-sample-block into at least one slice including portions of the samples, and performing a histological analysis on the portions of the samples on the at least one slice.

From another aspect, there is provided a method for preparing a medium-embedded sample block, the method comprising: obtaining a microfluidic device with samples, the microfluidic device comprising: a body having a top portion removeably attached to a bottom portion, the body having at least one channel formed therein in communication with a plurality of sample wells containing the samples, each channel being in fluid communication with an inlet port through which fluid can flow into the channel and an outlet port through which fluid can flow from the channel; removing the top portion of the body of the microfluidic device to expose an upper face of the bottom portion including the samples in the plurality of sample wells; placing embedding medium in the sample wells such that the embedding medium immerses the samples in the plurality of sample wells; allowing the embedding medium to form a block of embedding medium including the samples embedded therein; and separating the frame from the block of medium to obtain the medium-embedded-sample-block.

From a further aspect, there is provided A method for drug screening comprising: providing a microfluidic device containing biological samples, the microfluidic device comprising: a body having a top portion removeably attached to a bottom portion, the body having at least one channel formed therein in communication with a plurality of sample wells containing the biological samples, each channel being in fluid communication with an inlet port through which fluid can flow into the channel and an outlet port through which fluid can flow from the channel; preparing a medium-embedded sample block having the biological samples embedded therein, the preparing comprising: removing the top portion of the body of the microfluidic device to expose an upper face of the bottom portion including the samples in the plurality of sample wells; placing embedding medium in the sample wells such that the embedding medium immerses the samples in the plurality of sample wells; allowing the embedding medium to form a block of embedding medium including the samples embedded therein; and separating the frame from the block of medium to obtain the medium-embedded-sample-block; obtaining at least one slice of the medium-embedded-sample-block along a cutting plane including at least a portion of the biological samples; performing a drug screening method on the portion of the biological samples in the at least one slice.

From another aspect, there is provided a medium-embedded sample block, comprising: a block of medium, an array of samples embedded in the block of medium, the array of samples having a common cutting plane in the block of medium; the array of samples having an average surface area density of about 11 samples per $mm^2$, or more than about 11 samples per $mm^2$.

From a yet other aspect, there is provided a medium-embedded sample block, comprising: a block of medium, an array of samples embedded in the block of medium, the array of samples being positioned in a corresponding array of sample wells of a frame, the frame having an open face for accessing the sample in the sample wells in contact with the embedding medium.

Applications of the present technology include, but are not limited to, one or more of the following:

treatment screening (e.g. drug screening), in which many associated parameters of one or more treatments can be tested at the same time, in a microfluidic device, and assessed histologically using a slice of the medium-embedded-sample-block. The different parameters include drug dosages, drug equivalents, the effect of one drug on different biological samples, etc.

personalized medicine, in which a subject's biological sample is exposed to different treatments to assess which treatment is effective. The treatments can include chemotherapy, light therapy, and the like. The biological samples can be solid tumour biopsies from any part of the body, such as the lung, ovaries, prostate, gut, brain, etc.).

biomarker analysis monitored by Immunohistochemistry (IHC) or Immunofluorescence is used to characterize and predict chemosensitivity of biological samples. These techniques are regularly used to monitor the expression of proteins and their localization in the cell.

For immunohistochemistry procedures, the biological samples can be stained with Haematoxylin & Eosin (H&E) to determine the 3D structure, tissue morphology and localisation of the nucleus. It is also possible to stain the biological samples with predictive and prognostic biomarkers to help characterize the tumour and give indications on the subjects' sensitivity to different treatments. The subjects' response to treatment can then be analyzed by the level of expression of cell death by apoptosis (cleaved caspase-3 or cleaved parp-1) and cell proliferation (Ki67) markers. Through immunohistochemistry procedures, it is possible to combine any number of biomarkers, each fixed to a different fluorescent probe on one section of the medium-embedded-sample-block in order to quantify the expression of each biomarker.

Certain embodiments of the present technology provide certain advantages. As the frame can include a plurality of samples and can allow for their pre-processing before embedding, a high throughput can be achieved. Manual sample handling can be minimised or avoided inbetween pre-processing and embedding. The technology is versatile in that it can be applied to many different types of samples (e.g. ex vivo, in vitro etc). The use of microfluidic devices as the frame provides an ability to embed samples "on-chip". Microfluidic devices may be oxygen-permeable, optically transparent, flexible and cheap to produce.

Embodiments of the present technology can predict the actual effect of a drug on a patient's biopsied tumour by using an explant of the actual tumour. This is more accurate compared to known other known tests that use in vitro testing based on cell lines and not the patient's own tissue.

Optimal treatment for a given subject can be assessed in less than three weeks after the initial surgery. In current chemotherapy regimes, a wait time before a chemo-response can be inferred is a minimum of about 3-5 months after initiation of the treatment. Therefore, embodiments of the present could help reduce the cost, time and health risks associated with the selection of an inappropriate therapy.

Paraffin embedding preserves biological samples for a relatively long time (more than about six months). The paraffin-embedded-sample-block can be accessed retroactively and used for further analyses. For pharmaceutical applications, paraffin-embedded-sample-block containing large cohorts of patients, or large number of samples from a single patient treated with different treatments, or both, can be accumulated for prognostics studies (e.g. by correlating the previous in vitro response on tissue from patients known to be responders to predict treatment response of a new patient).

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale.

DETAILED DESCRIPTION

Broadly, one aspect of the present technology relates to methods and systems for preparing a medium-embedded-sample-block having a plurality of samples embedded therein as an array or microarray. In certain embodiments, the medium-embedded-sample-block is used to prepare thin slices (also referred to as "sections" herein) of the medium and samples, with each thin slice including a portion of all the samples with their relative spatial configuration maintained. The thin slices can be used for further analysis or processing including histological techniques, microscopy, exposure to reagents and the like for the purposes of diagnosis, research, treatment assessment, dosage calibration, and drug screening, to name a few.

Figure 1:
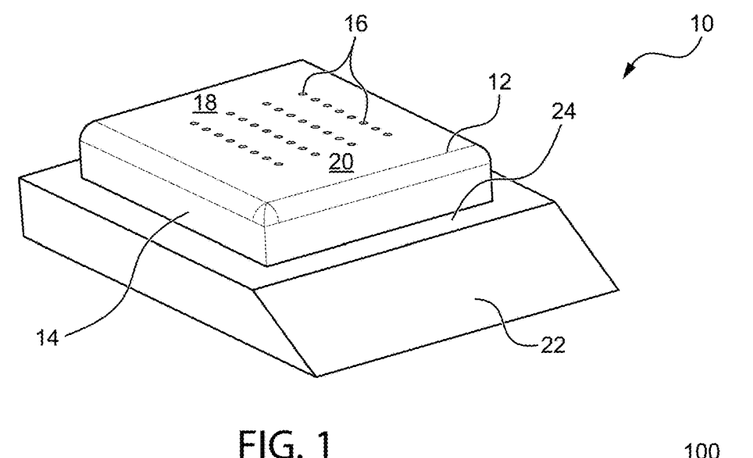
FIG. 1 is a perspective view of a medium-embedded-sample-block, according to certain aspects and embodiments of the present technology.

Referring initially to FIG. 1, there is shown a medium-embedded-sample-block 10 according to certain embodiments of the present technology. The medium-embedded-sample-block 10 comprises a block 12 of embedding medium 14, having embedded therein a plurality of samples 16.

The samples 16 are biological samples such as tissue samples or cellular samples. However, embodiments of the present technology are applicable to any other type of sample 16, or mixtures of samples, in which thin sections of that sample are useful for further processing or analysis. The samples 16 may be a plurality of tissue samples taken from an individual subject or different tissue samples from different subjects. Subjects can be human or animal. The tissue samples may be obtained in any manner from the subject such as by excision, biopsy, and the like. Tissue samples may be ex vivo samples from a subject or tissue engineered samples. In certain embodiments, the biological samples may also be isolated cells, or a bundle of cells such as in a cell culture, cell culture spheroids etc. Samples may include individual cells, or groups of cells.

The embedding medium 14 is a tissue embedding medium, in this example, a paraffin-based medium. The paraffin-based medium may be a pure paraffin or a blend of paraffin with other components such as dimethyl sulfoxide, hydrocarbon waxes, etc. In certain embodiments, the embedding medium 14 has a melting temperature above room temperature such that it is in a solid state at room temperature. Paraffin-based embedding mediums 14 typically have a melting temperature within the range of about 50-60° C.

Other examples of embedding media 14 include, but are not limited to, polyester wax formulations, polyethylene glycol based formulations, Polyfin®, PolyShield®, polyacrylamide gels, methyl methacrylate, glycol methacrylate, araldite®, epon® etc. In certain embodiments, the embedding medium 14 has a melting temperature below room temperature. In these embodiments, the embedding medium 14 can be a water-based medium and requires at least some handling of the medium-embedded-sample-block 10 at temperatures below room temperature, such as within a refrigerated environment. In some embodiments, the medium-embedded-sample-block 10 is a cryopreserved tissue sample which is sectioned in a cryostat.

Figure 10:
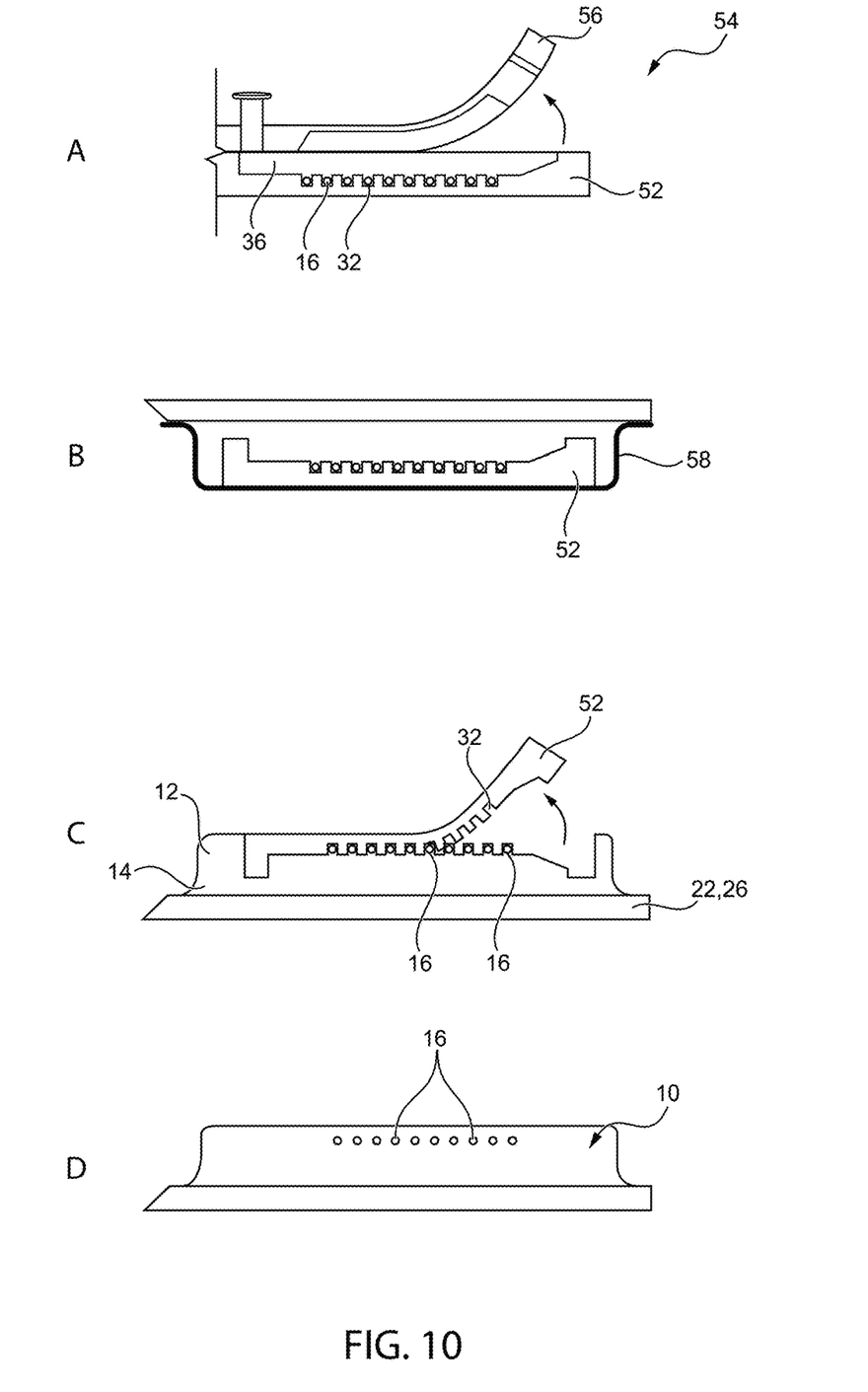
FIG. 10 is a schematic illustration of certain method steps, according to certain aspects and embodiments of the present technology.

As can best be seen in FIG. 10 (step D), the samples 16 are arranged on a common plane 18 (also referred to as a "cutting plane") within the medium-embedded-sample-block 10, the common plane 18 being substantially parallel to, and spaced from, a top surface 20 of the block 12. By being arranged on a common plane 18 is meant that a slice, on one plane, of the medium-embedded-sample-block 10 will include at least a portion of all the samples 16 within the medium-embedded-sample-block 10. In certain embodiments, the samples 16 have substantially the same orientation as one another, facilitating comparison between the samples 16. The samples 16 are arranged within the medium-embedded-sample-block 10 as a two-dimensional array. In the example of FIG. 1, the array comprises an 8×4 arrangement of the samples 16. However, any suitable arrangement of the tissue samples 16 on the same common plane 18 can be provided.

In certain embodiments, the array is a 7×10 arrangement of the samples 16 with a density of samples per surface area of about eleven samples per $mm^2$. In certain embodiments, the array has a density of samples per surface area of more than about eleven samples per $mm^2$. When the samples are cells or groups of cells, the sample density is even higher.

The medium-embedded-sample-block 10 also includes a support 22 positioned on a back surface 24 of the block 12. The support 22 can facilitate handling of the medium-embedded-sample-block 10 without direct contact of samples 16 embedded therein. This can avoid contamination of the samples 16.

During use, in certain embodiments, the medium-embedded-sample-block is mounted in a cutting device (not shown), such as a microtome, using the support 22, and thin sections of the embedding medium block 12 including the samples 16 embedded therein, typically 5 to 15 microns, are obtained one at a time by cutting along the block 12. These thin sections can be placed onto glass slides for histological processing.

Figure 2:
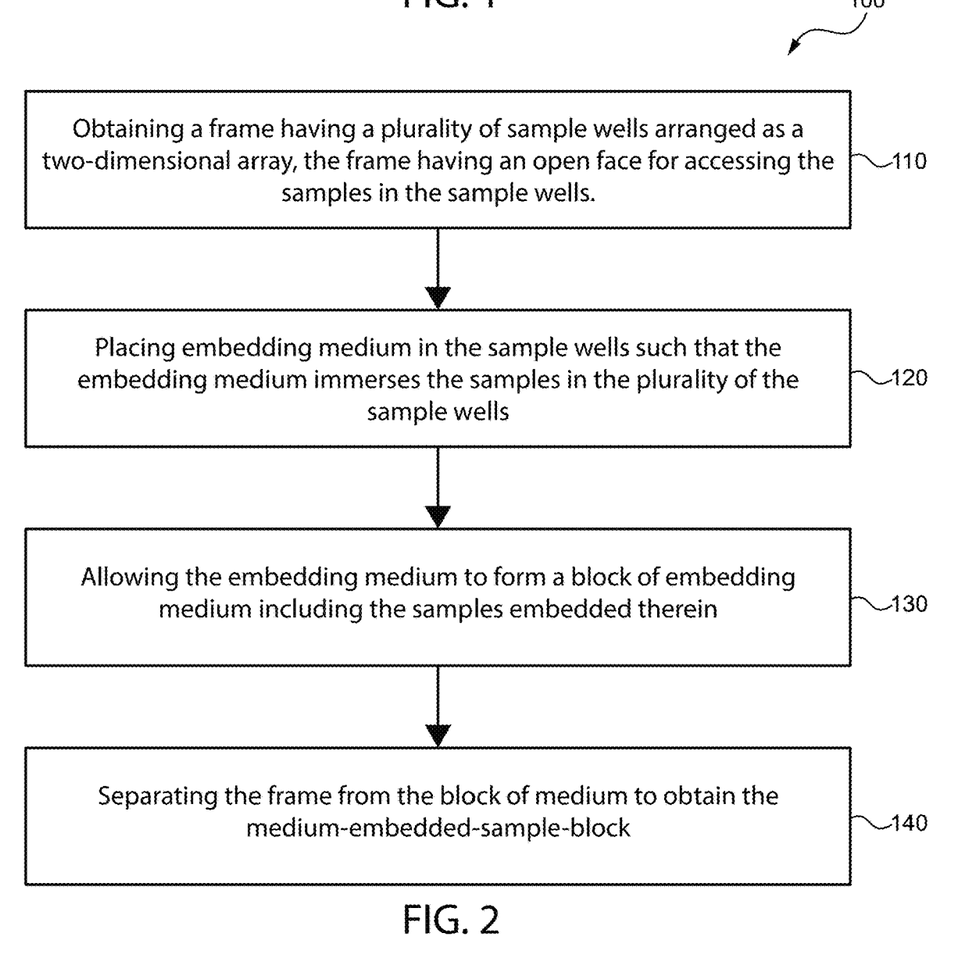
FIG. 2 is a schematic illustration of method steps for making the medium-embedded-sample-block, according to certain aspects and embodiments of the present technology.
Figure 3:
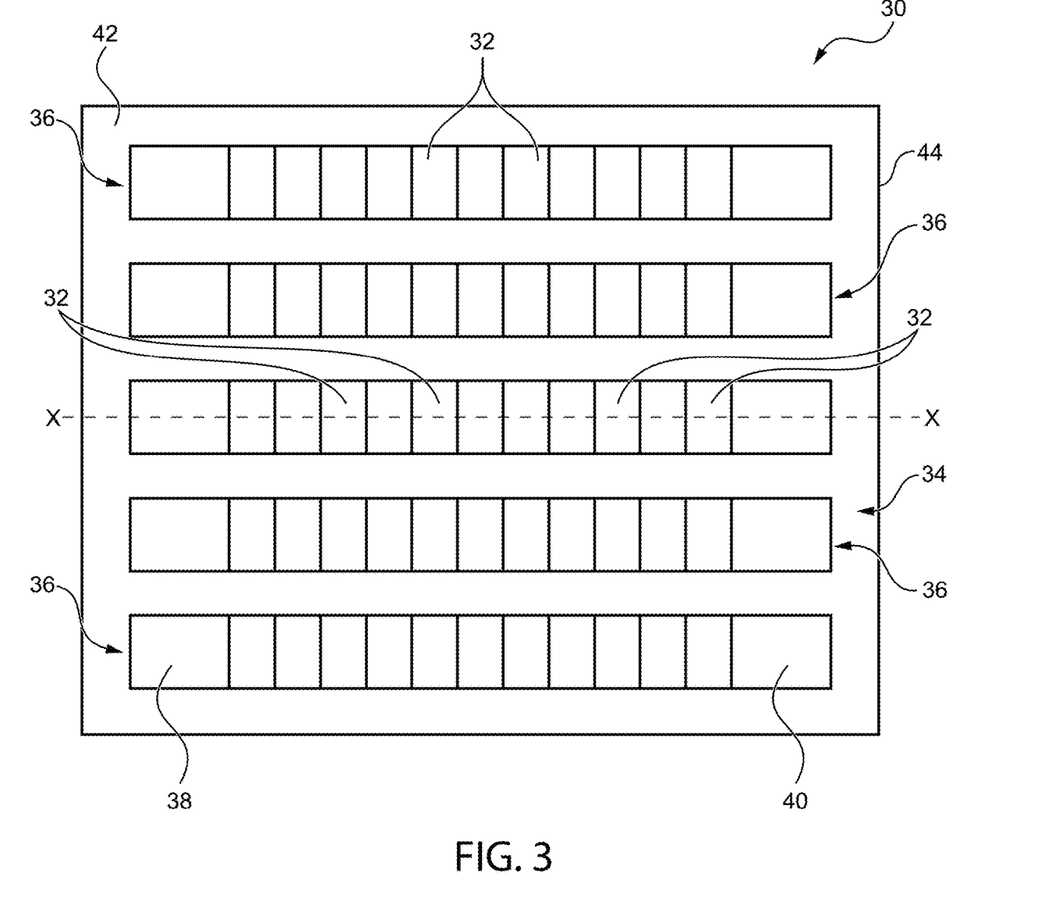
FIG. 3 is a top plan view of a frame used in the method of FIG. 2, according to certain aspects and embodiments of the present technology.
Figure 4:
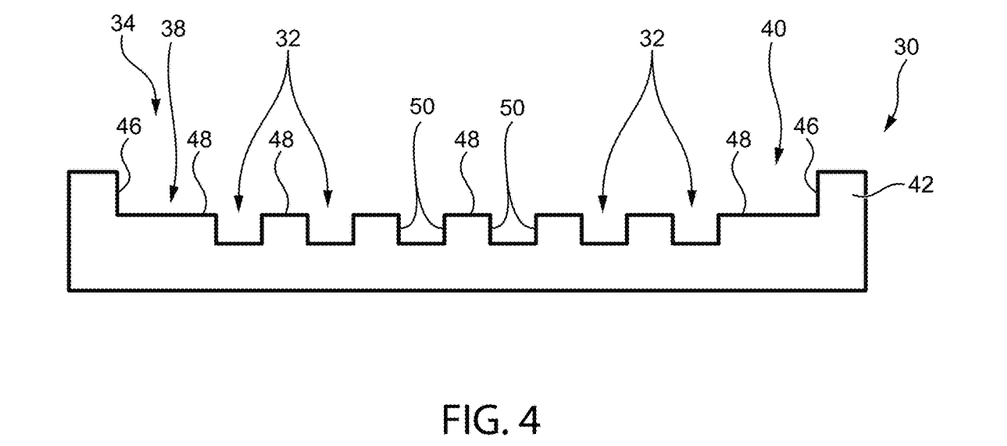
FIG. 4 is a cross-section of the microfluidic device of FIG. 3 along the line X-X'.

Referring now to FIG. 2 in conjunction with FIGS. 3 and 4, a method 100 of making the medium-embedded-sample-block 10, according to certain embodiments, is shown.

Broadly, the method 100 comprises obtaining a frame 30 having a plurality of sample wells 32 arranged as a two-dimensional array, the frame 30 having an open face 34 for accessing the samples 16 therein (Step 110), placing the embedding medium 14 in the sample wells 32 such that the embedding medium 14 immerses the samples 16 in the plurality of sample wells 32 (Step 120); allowing the embedding medium 14 to form the block 12 of embedding medium 14 including the samples 16 embedded therein (Step 130); and separating the frame 30 from the block 12 of embedding medium 14 to obtain the medium-embedded-sample-block 10 (Step 140).

The frame 30 is shown in FIGS. 3 and 4 and can have any configuration enabling a spatial configuration of the samples 16 relative to one another. In certain embodiments, the frame 30 is configured such that the array of sample wells 32 are fluidly connected to each other along one or more channels 36 of the frame. The channels 36 are defined along the open face 34, and at least two of the channels 36 have an ability to provide independent fluid connection from one another. Sample wells 32 of a given channel 36 can be fluidly isolated from sample wells 32 of another given channel 46. This structure of the frame 30 can be useful in certain upstream processing steps, if present, in order to be able to expose the samples 16 in the sample wells 32 of one channel 36 to a different reagent or different conditions than samples 16 in the sample wells 32 of another channel 36, whilst retaining the ability to perform a histological analysis on all the samples 16 from all the sample wells 32 at the same time.

Each channel 36 has an inlet port 38 for allowing fluid flow into the channel 36, and an outlet port 40 for allowing fluid flow from the channel 36. A rim 42 extends around a perimeter 44 of the frame 30, defining the open face 34. The rim 42 extends upwardly from the open face 34.

Each channel 36 comprises side channel walls 46 and a bottom channel wall 48. The sample wells 32 are defined within the bottom channel wall 48 and extend downwardly from the channel 36. Each channel 36 can be considered an uninterrupted passage, with the sample wells 32 extending from the passage. Each sample well 32 has well side walls 50 that are lower than a height of the rim 42. The sample wells 32 and the channel 36 can be of any shape or size. In other embodiments, instead of each channel 36 having its respective inlet port 38 and outlet port 40, one or more channels 36 of the frame 30 have a shared inlet port 38, and/or have a shared outlet port 40 via one or more manifolds (not shown).

Figure 5:
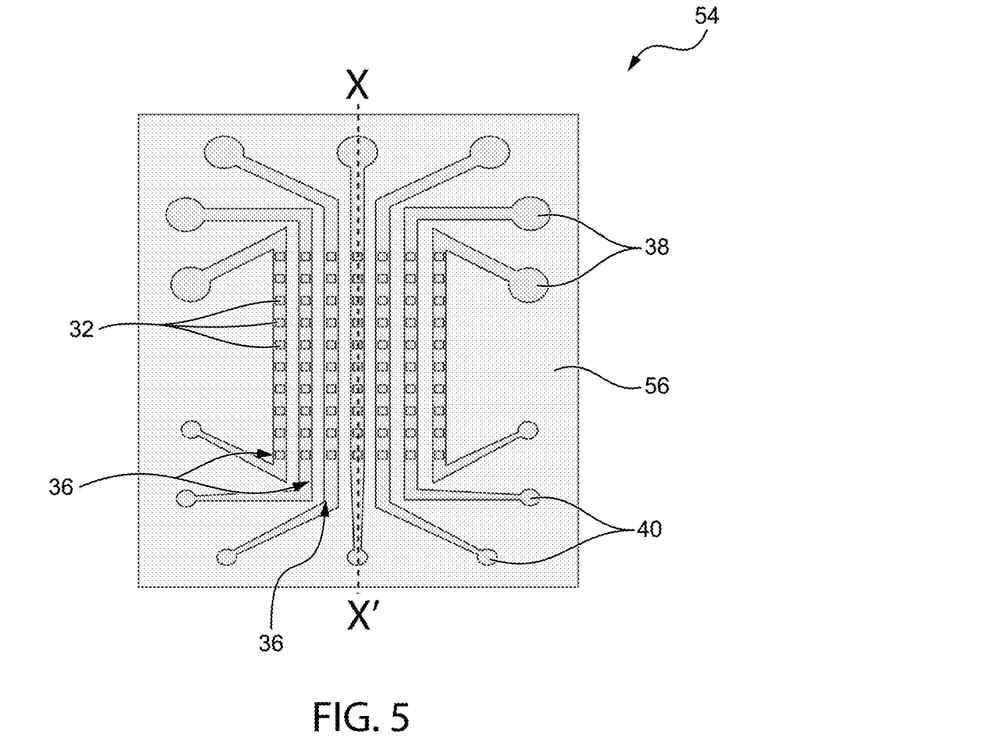
FIG. 5 is a top plan view of a microfluidic device used in the method of FIG. 2, according to certain aspects and embodiments of the present technology.
Figure 6:
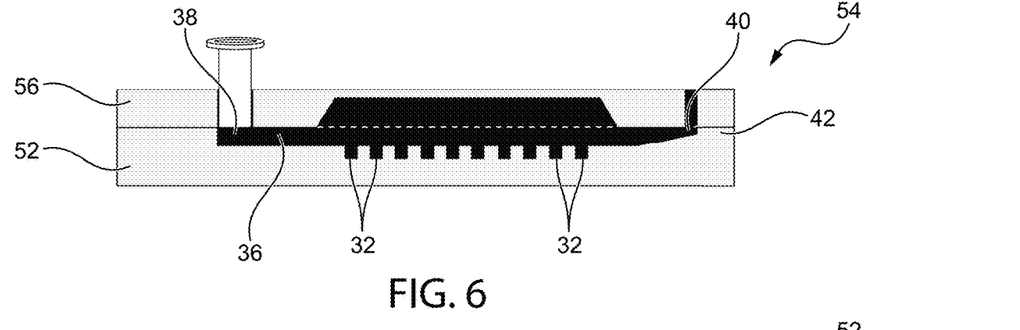
FIG. 6 is a cross-section of the microfluidic device of FIG. 5 along the line X-X'.
Figure 7:
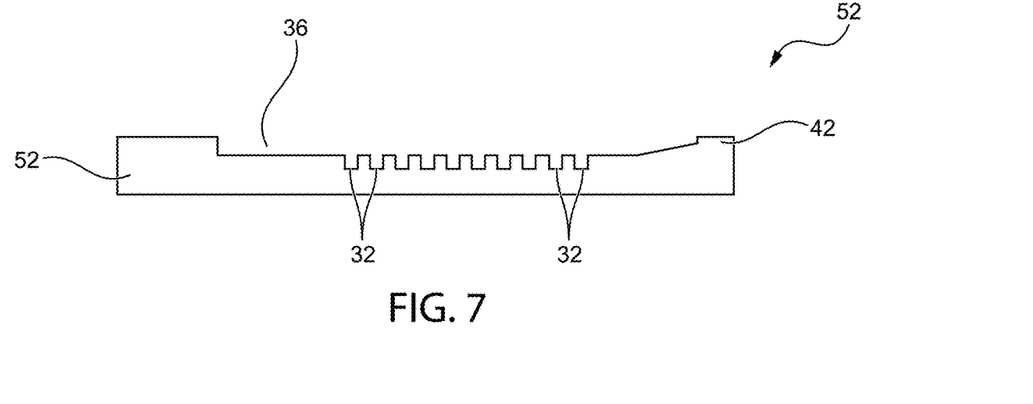
FIG. 7 is a cross-section of the microfluidic device of FIG. 5 along the line X-X', with a top portion removed for clarity.

In the embodiment of FIGS. 5-7, the frame 30 comprises a bottom portion 52 of a microfluidic device 54, with the sample wells 32 being defined by the well side walls 50 within the bottom portion 52 of the microfluidic device 54. The microfluidic device 54 comprises a top portion 56 removeably attached to the bottom portion 52 (best seen in FIGS. 5 and 6). The inlet port 38 and the outlet port 40 of each channel 36 fluidly communicate through the top portion 56 of the microfluidic device 54. The top portion 56 encloses the channels 36 of the bottom portion 52.

In the embodiments of FIGS. 5-7, the microfluidic device 54 has seven channels 36, each channel 36 having a rectangular cross-section of 1×0.7 mm Ten sample wells 32 of about 0.7 mm square cross-section and of about 0.6 mm in height are provided in fluid communication from each channel 36. Each channel 36 is an uninterrupted passage having a rectangular cross-section of about 1.1×1 mm, from which the sample wells 32 extend therefrom. Each channel 36 has one inlet port 38 and one outlet port 40 associated with it, the inlet and outlet ports 38, 40 being formed in the top portion 56 of the microfluidic device 54. The inlet ports 38 have a diameter of about 3.2 mm diameter, and the outlet ports 40 have a diameter of about 1.5 mm diameter. The top portion 56 and the bottom portion 52 each have a layer thickness of about 50 μm. The microfluidic device 54 is sized and shaped to be received in a standard histology cassette (not shown). Typically, the external dimensions of the microfluidic device 54 are 30×26×4.92 mm Seventy sample wells 32 are provided which are arranged as a 10×7 array. However, it will be appreciated that any other number of sample wells 32 can be provided. In terms of density of sample wells 32 per surface area, in the embodiment of FIGS. 5-7, there are provided approximately 11 sample wells per 1 mm². In other embodiments, the sample wells 32 have a surface density of more than about eleven sample wells per mm².

In certain other embodiments, the arrangement of the sample wells 32 may differ from those as illustrated in FIGS. 5-7. There may be provided more or less than the seventy sample wells 32. The surface area density may be more or less than the eleven sample wells per mm². Instead of a microfluidic device 54, any kind of frame 30 for pre-arranging samples 16 in a defined spatial configuration can be provided.

The frame 30, such as the microfluidic device 54 of FIGS. 5-7, can be made in any manner, such as by a three-dimensional printing process or by moulding. The top portion 56 and the bottom portion 52 are typically made separately and joined together. The microfluidic device 54 is made of polydimethylsiloxane, but can also be made of any other suitable material such any other polymer, a rubber, or the like. The sample wells 32 may have a coating of thickness ranging from the atomic scale to the macroscale. The coating may comprise one or more of a surface passivation layer (e.g. polyethylene glycol, albumin or other proteins), a surface functionalization monolayer (example: silanes), a reactive plasma treatment (grafting of molecular groups to a surface), a gel coating, and a surfactant coating, etc.

Figure 8:
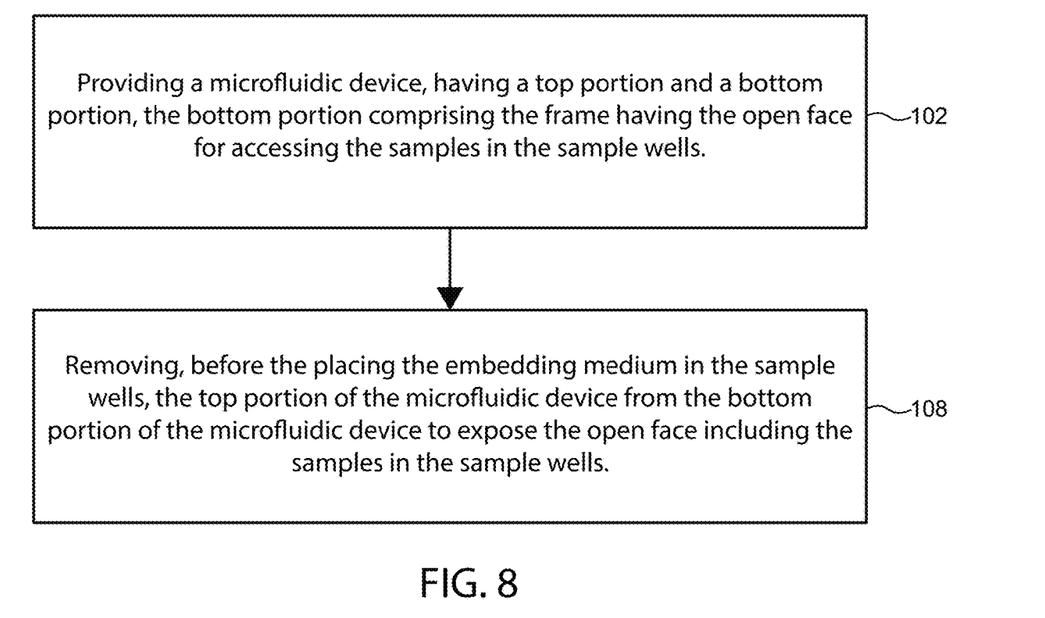
FIG. 8 is a schematic illustration of method steps for making the medium-embedded-sample-block, according to certain aspects and embodiments of the present technology.

Returning now to the method of FIG. 2 in conjunction with FIG. 8, in certain embodiments where the frame 30 comprises a microfluidic device 54, such as the microfluidic device 54 of FIGS. 5-7, before step 110, there is provided step 102 of providing the microfluidic device 54. In step 108, the method 100 comprises removing, before the placing the embedding medium 14 in the sample wells 32, the top portion 56 of the microfluidic device 54 from the bottom portion 52 of the microfluidic device 54 to expose the open face 34 including the samples 16 in the plurality of sample wells 32.

Figure 9:
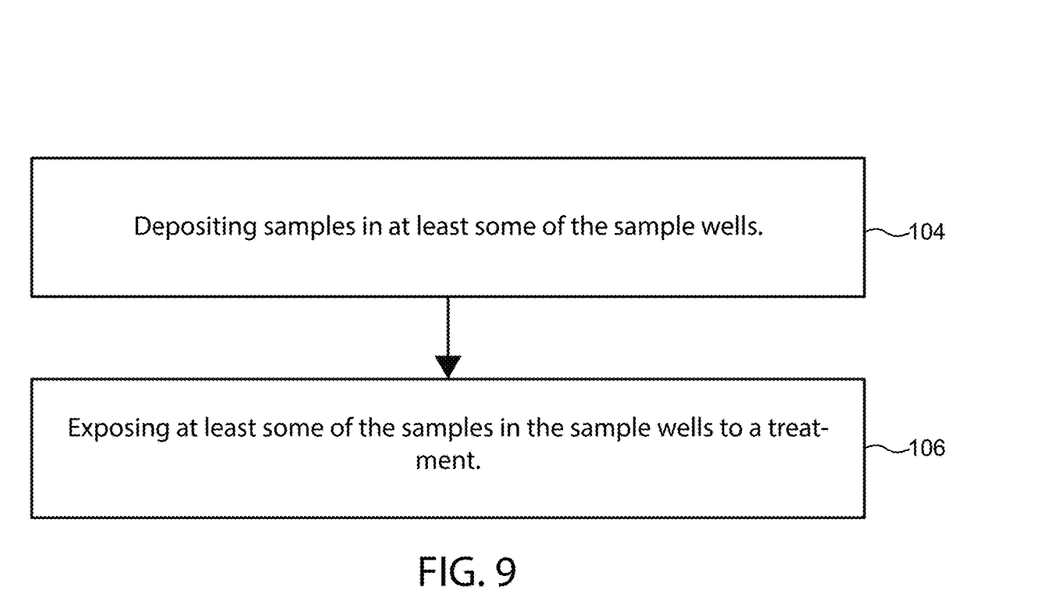
FIG. 9 is a schematic illustration of certain method steps, according to certain aspects and embodiments of the present technology.

Prior to step 108, in certain embodiments, the method 100 comprises depositing the samples 16 in at least some of the sample wells 32 of the microfluidic device 54 (Step 104) (FIG. 9).

In certain embodiments, the depositing the samples 16 comprises a one-step process for at least each channel 36 of the frame 30 where the samples 16 of each channel 36 are introduced into the channel 36 at substantially the same time. In certain embodiments, the frame permits on-frame processing of the samples, such as exposure to different treatments, reagents etc, before embedding of the samples.

For the embodiment of the microfluidic device of FIGS. 5-7, in which each channel 36 has ten sample wells 32, for each respective channel 36, ten biological samples 16 in a loading fluid are introduced into the respective channel 36 through the inlet port 38 of the given channel 36, whilst the top and bottom portions 56, 52 of the microfluidic device 54 are attached to one another. The samples 16 are allowed to sediment to the bottom of the channel 36. Flow is induced in the given channel 36 by aspirating fluid from the outlet port 40. Carried by the flow, the samples 16 travel in the given channel 36 and the flow is stopped for approximately 1-2 seconds when the samples 16 are above the sample wells 32, and the samples 16 are allowed to sediment in the sample wells 32. This is repeated for all the channels 16.

The method 100 may also comprise obtaining the samples 16. In certain embodiments, the samples 16 are biological ex vivo samples, obtained from a subject such as by biopsy. The ex vivo biological samples 16 are processed before depositing into the sample wells 32 of the frame 30, by cutting into appropriately sized and shaped pieces. A tissue punch can be used for this step, to obtain, for example, substantially sphere-like pieces of about 500 μm diameter.

The samples 16 may be micro-dissected tissue samples, prepared for example, using a micro-dissection technique described in Astolfi B et al, Micro-dissected tumor tissues on chip: an ex vivo method for drug testing and personalized therapy, Lab Chip 16, 312-325 (2016), the contents of which are incorporated herein. The tissue samples 16 may have a size which is large enough to mimic naturally occurring gradients of nutrients, waste and signaling molecules while also being small enough to maintain high viability throughout the tissue without risking anoxia in the center. In certain embodiments, the tissue sample 16 has a diameter of about 424 μm.

The biological samples 16 may be stored in a suitable medium to maintain cell viability after the biopsy, such as buffered saline solution (HBSS) supplemented with 10% FBS, 55 mg/L gentamicin and 0.6 mg/L amphotericin. The biological samples 16 may be fixed, with a fixing reagent such as formalin, before or after depositing in the sample wells 32. Once all the samples 16 are loaded in the microfluidic device 54, loading fluid can be replaced with a tissue-specific culture medium to keep the biological samples 16 viable.

The method 100 comprises, in certain embodiments, exposing at least some of the biological samples 16 in the sample wells 32 to a treatment (Step 106 of FIG. 9). This can be considered as a pre-processing step which is upstream to the formation of the medium-embedded-sample-block. In embodiments where the frame 30 is the microfluidic device 32, this step 106 is performed prior to the separation of the top portion 56 and the bottom portion 52 of the microfluidic device 54. The preprocessing step may include exposing the samples 16 to drugs, therapeutic agents, or other treatments.

In one embodiment, the samples 16 are viable tissue samples 16 including tumour cells from a single subject which are exposed to different chemotherapy drugs in order to assess an effective chemotherapy for the tumour for that particular subject. The samples 16 of each independent channel 36 are exposed to different therapeutic agents or a combination of therapeutic agents. One or more of the channels 36 are maintained as a control. The therapeutic agents can be any type of drug or active agent such as, but not limited to carboplatin, paclitaxel, docetaxel, and bicalutamide. The biological samples 16 can be left incubating within therapeutic agent for any suitable time, such as 24 hours, which may be followed by a recovery period in which the therapeutic agent is removed and replaced by a neutral medium. In certain embodiments, two or more cycles of the exposure to the therapeutic agent are provided.

In other embodiments, the samples 16 are exposed to any other type of treatment which may require a histological analysis thereafter, such as but not limited to molecular agents or drugs, cellular therapy, gene therapy, nanoparticles, liposomes, vesicles, micelles, viruses, and radiotherapy (curie therapy, radiation therapy, proton therapy).

Referring back to the method 100 of FIG. 2, before the step 120 of placing embedding medium 14 in the sample wells 32 such that the embedding medium 14 immerses the samples 16 in the plurality of sample wells 32, the samples 16 are prepared for immersion in certain embodiments.

In certain embodiments, the embedding medium 14 is a paraffin-based composition suitable for paraffin embedding of biological tissues. In these embodiments, the method 100 may further comprise, before placing the embedding medium 14 in the sample wells 32, preparing the samples 16 for infiltration of the paraffin, such as by exposing the samples 16 in the sample wells 32 to alcohol solution(s) to dehydrate them. In certain embodiments, increasing concentrations of ethanol from 70 to 100% are used. Following the dehydration process, the biological samples 16 may be exposed to a clearing agent to remove the alcohol and any remaining water. A suitable clearing agent is xylene, or the like.

By performing the abovementioned preparation steps in the frame 30, the amount of reagents used and the total time required for this step is made more efficient.

In step 120 of placing the embedding medium 14 on the samples 16, this step 120 includes placing embedding medium 14 in the channels 36 as well as the sample wells 32 such that the embedding medium 14 immerses the samples 16 in the sample wells 32, and fills the respective channel 16 of the frame 30. Placing the embedding medium 14 in the sample wells 32 comprises forming an uninterrupted layer of embedding medium 14 above the sample wells 32. By uninterrupted layer is meant a solid layer above the sample wells 32. In certain embodiments, placing the embedding medium 14 in the sample wells 32 comprises filling the sample wells 32 with the embedding medium 14, filling the channel 16 above the sample wells 32 with the embedding medium 14, and forming a layer of embedding medium 14 above the sample wells 32. The embedding medium 14 is typically liquid or in a flowable form at this stage.

In certain embodiments, the frame 30 is placed in an open container 58, which is deeper than a height of the frame 30, and the embedding medium 14 is added to the open container 58 over the frame 30 such that the frame 30 is immersed in the embedding medium 14. Walls 60 of the open container 58 will define an outer shape of the medium-embedded-sample-block 10. The block 12 of the embedding medium 14 will therefore have a height larger than the frame 30 height. In the embodiments where the frame 30 is a microfluidic device 54, the top portion 56 of the microfluidic device 54 is removed from the bottom portion 52 before adding the embedding medium 14 to the samples 16 (FIG. 10A).

Referring now to step 130 of FIG. 2, when the embedding medium 14 is the paraffin-based composition, allowing the embedding medium 14 to form the block 12 of embedding medium 14 including the samples 16 embedded therein comprises incubating the samples 16 in liquid paraffin (such as at temperatures above about 65° C., such as 68° C.), and allowing the paraffin to solidify by lowering the temperature (FIG. 10B). In certain embodiments, the frame 30 including the liquid paraffin immersed samples 16 are placed in a refrigerator at 4° C. A cover 62 is placed over the open container 58 and in contact with the embedding medium 14 to form the support 22 to the block 12 of the embedding medium 14. When the embedding medium 14 is another type of embedding medium 14 other than paraffin, the step 130 comprises exposing the embedding medium 14 to conditions suitable for a change of state to a solid state or a cohesive state, or to increase a cohesiveness of the embedding medium 14 such as by gelling or the like. The method 100 comprises removing the open container 58 from the block 10 of embedding medium 14, after its solidification, whilst retaining the support 22.

In step 140 of FIG. 2, once the embedding medium 14 is adequately solidified or cohesive (FIG. 10C), the frame 30 is removed from the block 12 of embedding medium 14 exposing a face 64 of the block 12 that was adjacent the frame 30. As seen clearly in FIG. 10C, the samples 16 embedded in the block 12 are now relatively close to the exposed face 64 of medium block 12. The exposed face 64 has a castellated configuration with the samples being embedded within the protruding castellations. As illustrated in FIG. 10C, the block 12 of embedding medium 14 including the frame 30 is turned upside down for this step.

This step 140 may further include applying a further quantity of embedding medium 14, such as the paraffin, to the exposed face 64 of the block 12 after removing the frame 30, and allowing the additional embedding medium 14 to cover the exposed face 64 of the block 12. In the case of the embedding medium 14 being paraffin, a layer of paraffin is added above the medium embedded samples 16 to the exposed face 64 of the block 12 once the frame 30 is removed, and heated to allow the two paraffin layers to bond together. The blocks 12 can then be left, such as overnight at room temperature, to completely solidify (FIG. 10D) and form the resultant medium-embedded-sample-block.

In an optional step, once completely solidified, the viscosity of the embedding medium block 12 is reduced, such as by heating, to transform the block 12 to the liquid phase. This enables the samples 16 to sediment and align on the same cutting plane. The block 12 is then re-solidified and is ready for use.

Uses for the medium-embedded-sample-block 10 include screening methods such as drug screening, histological methods such as immunohistochemistry, and other imaging methods.

In other aspects, there is provided a kit or system for the preparation of a medium-embedded-sample-block, the kit or system comprising one or more of: the embedding medium 14, the support 22, the frame 30, the open container 58, and the cover 62. The kit or system can also include one or more pipettes, scalpels, and other disposables.

EXAMPLES

The following examples are illustrative of the wide range of applicability of the present technology and are not intended to limit its scope. Modifications and variations can be made therein without departing from the spirit and scope of the invention.

Example 1—Histological and Immuno-Histological Analysis of the Medium-Embedded-Sample-Block Tissue samples of one high-grade ovarian cancer subject and one prostate cancer subject with a Gleason score 3+4 were obtained and placed into the microfluidic device illustrated in FIGS. 5-7. The tissue samples were exposed to a combinatorial therapy including Carboplatin at a concentration of 300 µM and Paclitaxel at a concentration of 80 nM in the microfluidic device. The samples in one channel of the microfluidic device 54 were left untreated as a control. There were two treatment cycles over eight days. A medium-embedded-sample-block 10 was prepared according to an embodiment of the method 100 described herein. Hematoxylin and eosin (H&E) staining was performed on thin sections of the medium-embedded-sample-block 10 in order to image maintained tissue structure and presence of cells.

Figure 11:
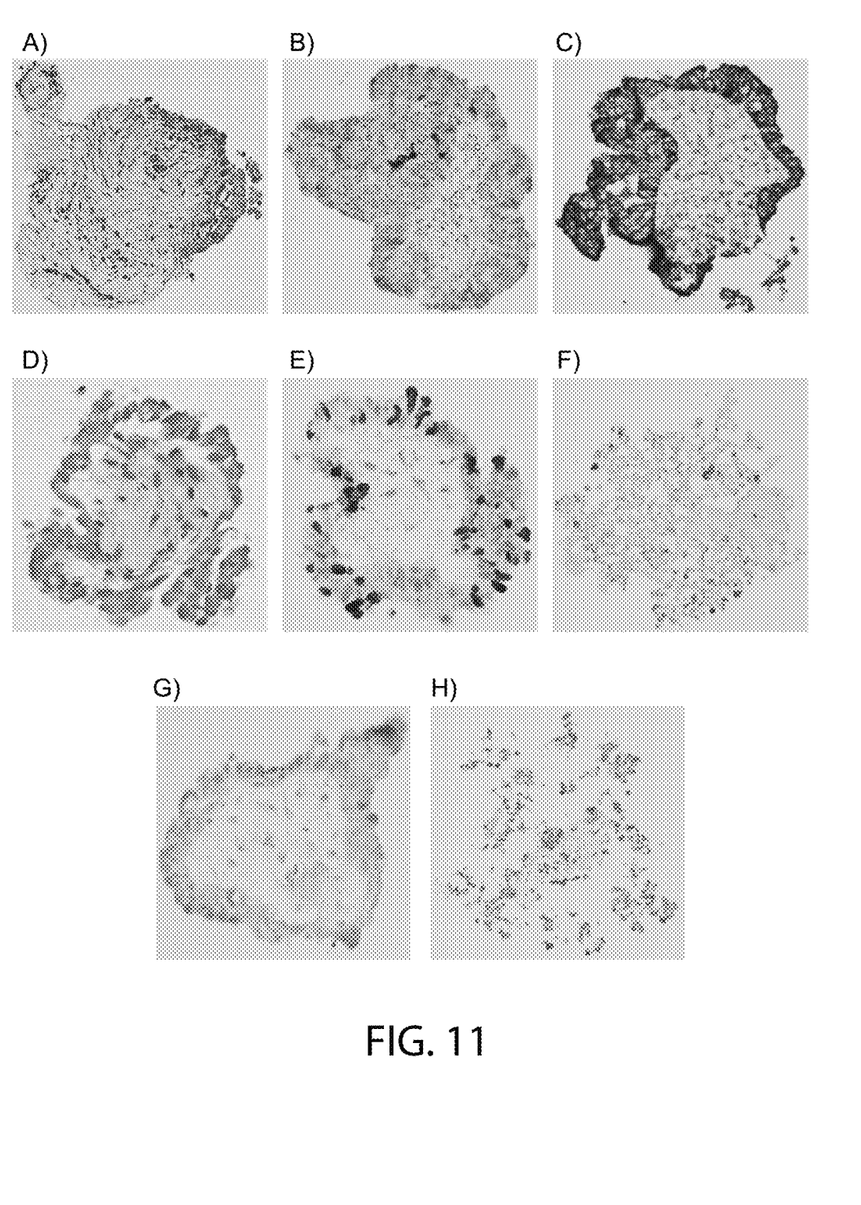
FIG. 11 is an optical micrograph of stained samples obtained from a medium-embedded-sample-block, according to certain embodiments of the present technology (Example 1)
Figure 12:
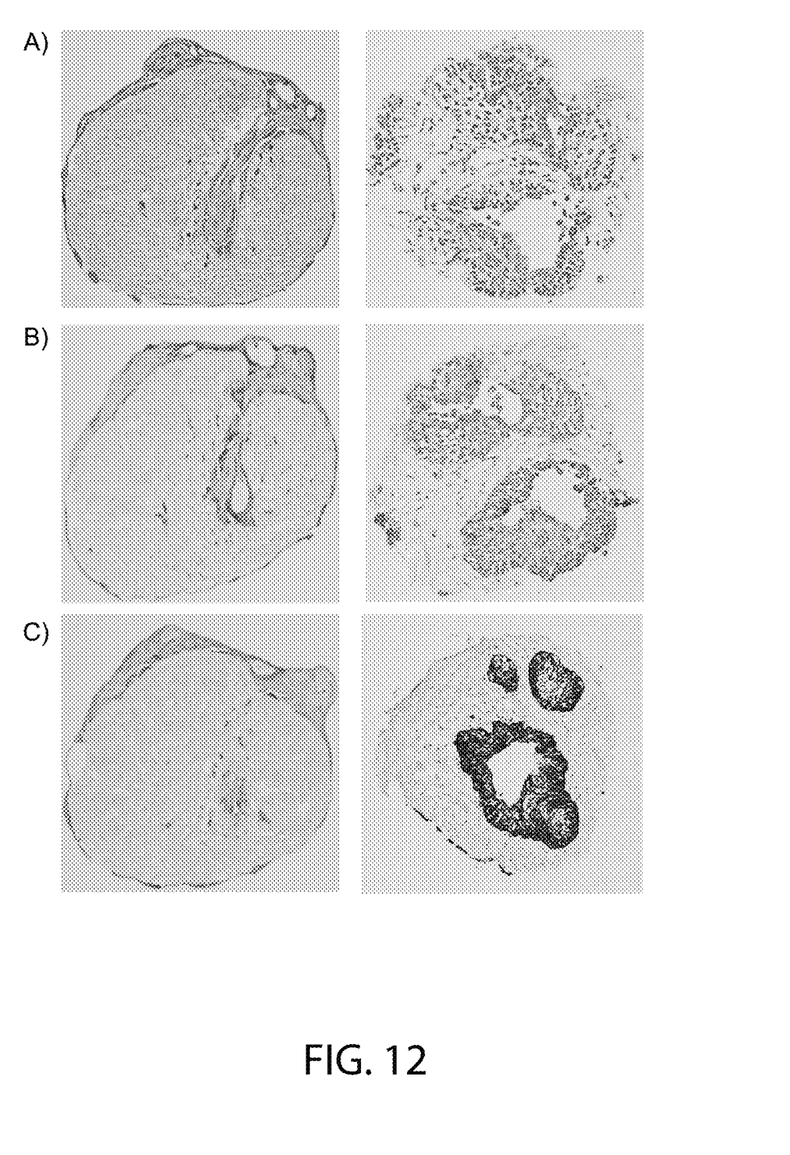
FIG. 12 shows immunohistochemistry results of samples obtained from a medium-embedded-sample-block, according to certain embodiments of the present technology (Example 1)

FIG. 11 shows an optical micrograph of the H&E stained tissue samples at day 0 (FIG. 11A) showing the presence of overly large diameter nuclei from the presence of cancer cells in the tissue sample. Further analyses were done using predictive and prognostic biomarkers such as claudin-7 (FIG. 11B), a protein involved in tight junction regulation of epithelial cells and clusterin (FIG. 11C), a heterodimeric protein associated with clearance of cellular debris and apoptosis. The ovarian cancer sample showed moderate levels of claudin-7 and relatively high expression of clusterin, corresponding to the patient diagnosis. The day 8 untreated tissue samples were first analysed using H&E staining (FIG. 11D) showing presence of cancer cells as well as no evolutionary change in cell structure in comparison to day 0 tissue samples. The untreated (FIG. 11E, 11G) and treated (FIG. 11F, 11H) samples were then analysed using treatment response biomarkers such as cell proliferation marker, Ki-67 (FIG. 11E, 11F) and cell death by apoptosis marker, cleaved caspase-3 (FIG. 11G, 11H). The results showed a reduction of Ki-67 expression in treated tissues compared to untreated tissues. On the contrary, caspase-3 expression was increased in the treated tissues compared to the untreated tissues. In addition to biomarker evaluation, the treated tissues showed a presence of structural decomposition and destruction of epithelial cells indicating good treatment response. For the prostate cancer sample, immunohistochemistry analyses were performed only on day 0 (FIG. 12). H&E staining (FIG. 12A) show the architecture of a typical prostate tissue, presence of atypical glands and nuclear enlargement of prominent nuclei. Predictive and prognostic biomarker analysis of IKKε (FIG. 12B), a protein involved in the secretion of cytokines such as IL-6 and associated with tumor progression and p65 (FIG. 12C), a protein involved in NF-ηB heterodimer formation, nuclear translocation and activation.

Example 2—GFP Testing

Figure 13:
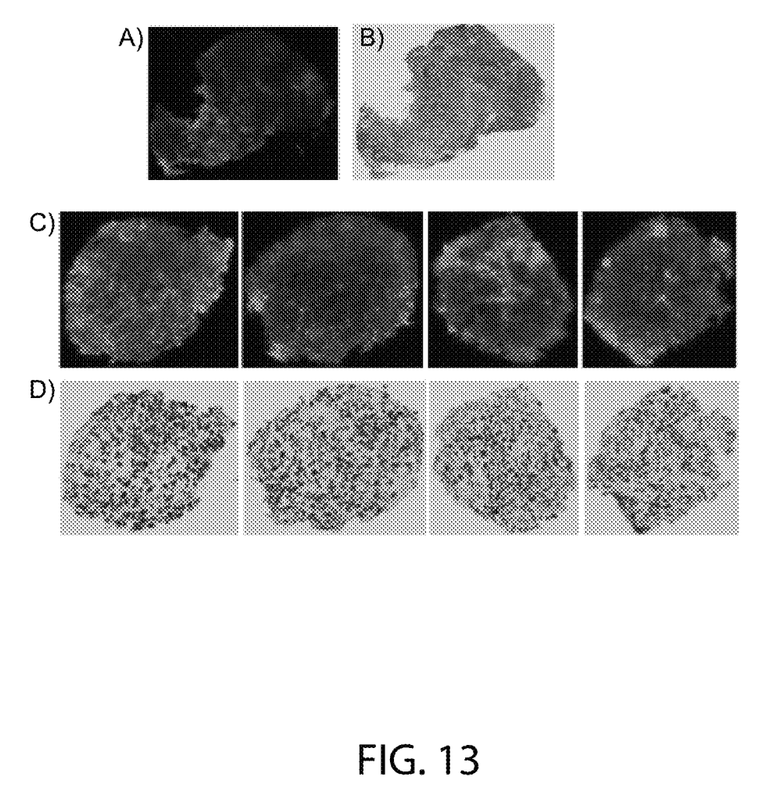
FIG. 13 shows immunohistochemistry results of samples obtained from a medium-embedded-sample-block, according to certain embodiments of the present technology (Example 2)

In addition to immunohistochemistry analysis, GFP (green fluorescent protein) expression in tissue samples was studied and found to be maintained even after paraffin embedding, according to present aspects and embodiments, as shown in FIG. 13A. Tissue was obtained from a tumor based xenograft model where OV1946 cell line transfected with GFP stable clones had been injected into sub-cutaneous into a female mouse. Once the tumor reached a volume of about 400 mm$^3$, it was resected from the mouse and processed to produce the tissue samples which were further used for FACs and confocal analysis. The samples were treated in the sample wells 32 of the microfluidic device 54 followed by confocal microscopy to image the samples. A xenograft fragment was also fixed and stained with anti-mitochondrial antibody to evaluate human cell presence in tumor resection FIG. 13B. This analysis determined the percentage of GFP expression in the samples and correlated GFP expression with a quantification analysis of the presence of human cell line stable clone compared to infiltrating mouse stromal cells. The expression of GFP shown in FIG. 13C was shown to concord with the confocal analysis results. In addition, an immunohistochemistry staining of the same tissue samples with an anti-mitochondrial antibody (FIG. 13D) that allows the detection of uniquely human cells allowed the quantification of GFP expressing human cells showing an estimation of between 10-20% infiltration of mouse stromal cells.

It should be expressly understood that not all technical effects mentioned herein need to be enjoyed in each and every embodiment of the present technology.

Modifications and improvements to the above-described implementations of the present technology may become apparent to those skilled in the art. For example, alternative transverse adjustment mechanisms and longitudinal adjustment mechanisms are possible. The foregoing description is intended to be exemplary rather than limiting. The scope of the present technology is therefore intended to be limited solely by the scope of the appended claims.

The invention claimed is:

1. A method for preparing a medium-embedded-sample-block, the method comprising:
    obtaining a bottom portion of a microfluidic device, the bottom portion having been separated from a top portion of the microfluidic device, the bottom portion having a plurality of sample wells arranged as a two-dimensional array, and an open face for accessing samples in the plurality of sample wells;
    placing embedding medium in the plurality of sample wells such that the embedding medium immerses the samples in the plurality of sample wells;
    allowing the embedding medium to form a block of embedding medium including the samples embedded therein; and
    separating the bottom portion of the microfluidic device from the block of embedding medium to obtain the medium-embedded-sample-block.

2. The method of claim 1, wherein placing the embedding medium in the plurality of sample wells comprises forming a layer of embedding medium above the plurality of sample wells, the layer comprising an uninterrupted layer.

3. The method of claim 1, wherein placing the embedding medium in the plurality of sample wells comprises filling the plurality of sample wells with the embedding medium, filling a channel above the plurality of sample wells with the embedding medium, and forming a layer of embedding medium above the plurality of sample wells.

4. The method of claim 1, wherein the bottom portion comprises a frame having the open face for accessing the samples in the plurality of sample wells.

5. The method of claim 1, further comprising, removing the top portion from the bottom portion to expose the open face and the samples in the plurality of sample wells.

6. The method of claim 1, wherein the embedding medium is a paraffin-based composition.

7. The method of claim 6, wherein before placing the embedding medium in the plurality of sample wells, the method comprises dehydrating the samples.

8. The method of claim 1, wherein the embedding medium is in a liquid state when immersing the samples, and the allowing the embedding medium to form the block of embedding medium comprises allowing a change in a state of the embedding medium from the liquid state to a solid state.

9. The method of claim 4, wherein the placing the embedding medium in the plurality of sample wells comprises immersing the frame in the embedding medium.

10. The method of claim 9, further comprising placing the frame within an open container, the open container being deeper than a height of the frame, and adding the embedding medium to fill the open container over the frame such that the frame is immersed in the embedding medium.

11. The method of claim 9, wherein the frame is immersed in the embedding medium in an open container, the method further comprising providing a cover to the open container in contact with the embedding medium.

12. The method of claim 10, after the allowing the embedding medium to form the block of embedding medium including the samples embedded therein, the method further comprising removing the open container from the block of embedding medium.

13. The method of claim 1, wherein the separating the bottom portion of the microfluidic device from the block of embedding medium to obtain the medium-embedded-sample-block further comprises applying additional embedding medium to an exposed face of the block of embedding medium after removing the bottom portion, and allowing the additional embedding medium to cover the exposed face of the block of embedding medium.

14. The method of claim 1, further comprising aligning the samples in the medium-embedded-sample-block on a cutting plane by reducing a viscosity of the medium-embedded-sample-block before restoring the viscosity.

15. The method of claim 1, further comprising providing the samples, which are biological biopsy samples.

16. The method of claim 1, further comprising exposing the samples in the plurality of sample wells to a treatment before placing the embedding medium in the plurality of sample wells.

17. The method of claim 16, wherein the samples are arranged in channels in the bottom portion, and the exposing the samples in the plurality of sample wells to the treatment comprises exposing samples in at least two different channels to different treatments.

18. The method of claim 1, further comprising cutting the medium-embedded-sample-block into at least one slice including portions of the samples, and performing a histological analysis on the portions of the samples on the at least one slice.

19. A method for preparing a medium-embedded-sample-block, the method comprising:
obtaining a microfluidic device with samples, the microfluidic device comprising:
a body having a top portion removeably attached to a bottom portion, the body having at least one channel formed therein in communication with a plurality of sample wells containing the samples, each channel being in fluid communication with an inlet port through which fluid can flow into the channel and an outlet port through which fluid can flow from the channel;
removing the top portion of the body of the microfluidic device to expose an upper face of the bottom portion including the samples in the plurality of sample wells;
placing embedding medium in the plurality of sample wells such that the embedding medium immerses the samples in the plurality of sample wells;
allowing the embedding medium to form a block of embedding medium including the samples embedded therein; and
separating the bottom portion of the microfluidic device from the block of embedding medium to obtain the medium-embedded-sample-block.

20. A method for drug screening comprising:
providing a microfluidic device containing biological samples, the microfluidic device comprising:
a body having a top portion removeably attached to a bottom portion, the body having at least one channel formed therein in communication with a plurality of sample wells containing the biological samples, each channel being in fluid communication with an inlet port through which fluid can flow into the channel and an outlet port through which fluid can flow from the channel;
preparing a medium-embedded-sample-block having the biological samples embedded therein, the preparing comprising:
removing the top portion of the body of the microfluidic device to expose an upper face of the bottom portion including the samples in the plurality of sample wells;
placing embedding medium in the plurality of sample wells such that the embedding medium immerses the samples in the plurality of sample wells;
allowing the embedding medium to form a block of embedding medium including the samples embedded therein; and
separating the bottom portion of the microfluidic device from the block of embedding_medium to obtain the medium-embedded-sample-block;
obtaining at least one slice of the medium-embedded-sample-block along a cutting plane including at least a portion of the biological samples; and performing a drug screening method on the portion of the biological samples in the at least one slice.

* * * * *